Oct. 12, 1943.    W. TRIBLE    2,331,442

PLUGGING SWITCH

Filed Dec. 15, 1941    2 Sheets-Sheet 1

INVENTOR.
WINTHROP TRIBLE
BY
OHK Parsons
ATTORNEY.

Oct. 12, 1943.  W. TRIBLE  2,331,442
PLUGGING SWITCH
Filed Dec. 15, 1941  2 Sheets-Sheet 2

INVENTOR.
WINTHROP TRIBLE
BY
*AH Parsons*
ATTORNEY

Patented Oct. 12, 1943

2,331,442

UNITED STATES PATENT OFFICE 2,331,442

PLUGGING SWITCH

Winthrop Trible, Cincinnati, Ohio, assignor to The Cincinnati Milling Machine Co., Cincinnati, Ohio, a corporation of Ohio Application December 15, 1941, Serial No. 423,014

9 Claims. (Cl. 200—80)

This invention relates to electrical switches and more particularly to improvements in a plugging switch for motors.

One of the objects of this invention is to provide a plugging switch of improved and simplified construction and so compact that it may be mounted in a limited space.

Another object of this invention is to provide a switching mechanism of the character described which is automatically locked when at rest and which will not become unlocked until the motor with which it is used has nearly reached its normal speed of operation, thereby rendering the device safe for use in connection with driving parts that might be momentarily actuated manually for adjustment or set-up purposes.

Other objects and advantages of the present invention should be readily apparent by reference to the following specification, considered in conjunction with the accompanying drawings forming a part thereof and it is to be understood that any modifications may be made in the exact structural details there shown and described, within the scope of the appended claims, without departing from or exceeding the spirit of the invention.

Referring to the drawings in which like reference numerals indicate like or similar parts:

Figure 1:
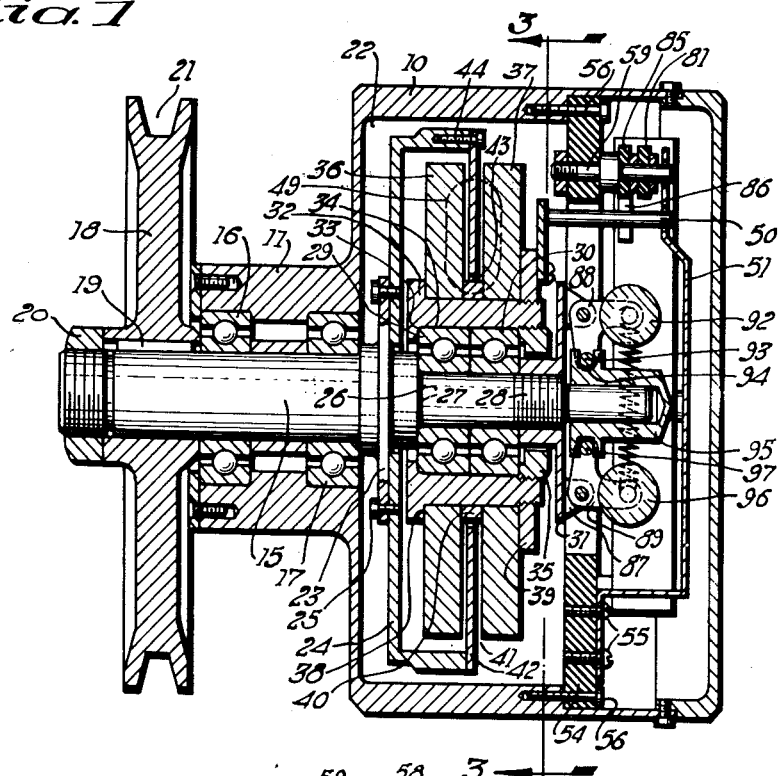
Figure 1 is a section through the switch mechanism constructed in accordance with the principles of this invention.

In Figure 1 of the drawings the reference numeral 10 indicates the switch casing which is cylindrical in shape and which has a reduced portion 11 formed on one end. The casing may be mounted on any suitable portion of a machine or other structure by means of a suitably shaped bracket, one such bracket, such as 12, being indicated in Figure 2 for mounting the casing on a flat pad of a machine, the casing being attached to the bracket by countersunk screws 13. The bracket may be provided with a suitable number of holes 14 through which bolts may be passed for fastening the bracket to a machine.

A drive shaft 15 is supported by anti-friction bearings 16 and 17 in the reduced portion 11 of the casing and a drive pulley 18 is attached to the projecting end of the shaft as by a driving key 19 and nut 20 which is threaded on the end of the shaft. The pulley 18 may have its periphery configured to suit the shape or construction of the motion transmitting band surrounding it and in the present instance the pulley is provided with a V-shaped groove 21 for receiving a V-belt.

The driving shaft 15 projects into the chamber 22 of the casing 10 and is provided with a flange 23 to which is attached an aluminum cup 24 as by screws 25.

Beyond the flange is a reduced portion 26 forming a shoulder 27 and the portion 26 is threaded at 28. A pair of anti-friction bearings 29 and 30 have their inner races mounted on the reduced portion 26 of the shaft and clamped thereto between the shoulder 27 and a nut member 31 screwed on the threaded portion 28. The outer races of the anti-friction bearings 29 and 30 are clamped to a carrier 32 between a shoulder 33 formed at one end of the bore 34 formed in the carrier and a nut 35 threaded in the other end of the bore. By means of this construction the carrier 32 is rotatable independently of the shaft so that rotation of the shaft will not necessarily impart rotation to the carrier. This carrier serves to support a pair of magnets 36 and 37 which are clamped thereto between a shoulder 38 formed integral with the carrier and a nut member 39 threaded on the other end of the carrier.

Figure 3:
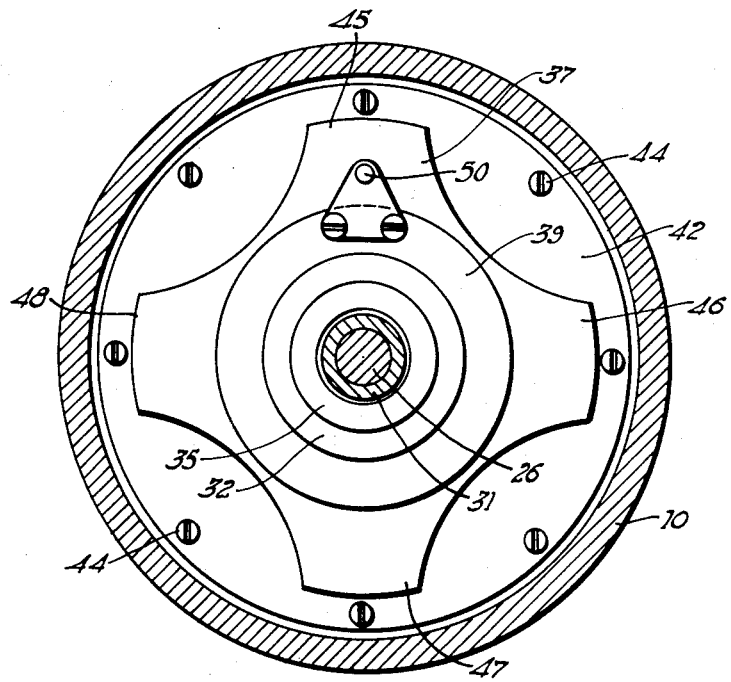
Figure 3 is a section on the line 3—3 of Figure 1.

A spacer 40 is interposed between the magnets to provide a space 41 in which is mounted an aluminum disc 42. The disc has a central hole 43 which is sufficiently large to clear the spacer 40 and is supported in spaced relation to the two magnets by the aluminum cup 24 to which it is attached by screw 44. The magnets are of similar construction and one of them is shown in elevation in Figure 3. It will be noted that it is cut away to form four poles 45, 46, 47 and 48 which are so magnetized that the poles 45 and 46 have one polarity, and the poles 47 and 48 have an opposite polarity. The magnets are so mounted that their poles lie in equally spaced radial planes but the pair of poles in any given plane and on opposite sides of the aluminum plate are of opposite polarity so as to create a flow of magnetic flux through the aluminum plate and along a path indicated by the dotted line 49 as shown in Figure 1.

When the aluminum plate is rotated relative to the magnets it causes a distortion of the lines of magnetic flux passing through the plate in such a manner as to create a rotational urge on the magnets and normally cause them to rotate with the plate. This constitutes a form of frictionless clutch.

Figure 2:
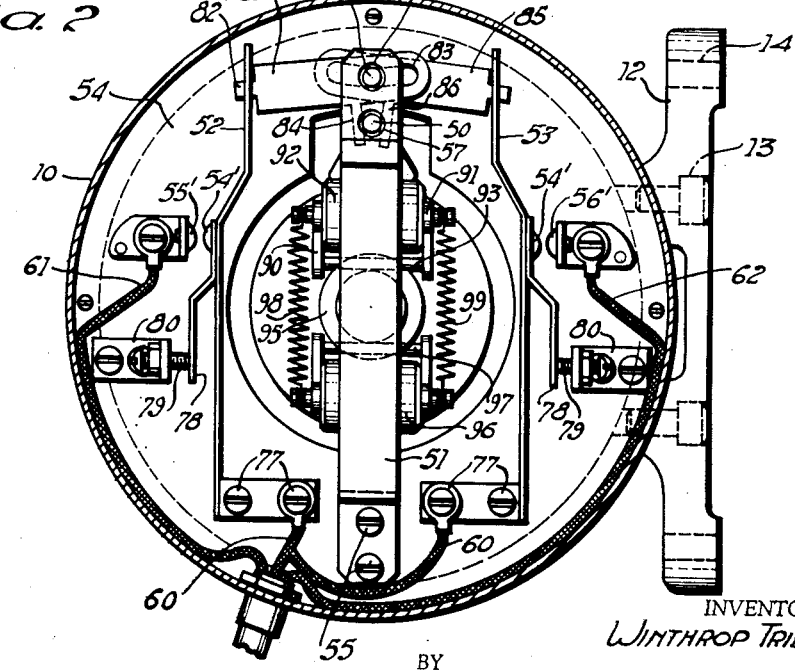
Figure 2 is an end view of the structure shown in Figure 1 with the end cover removed.

Means are provided, however, for locking the magnets against rotation until the drive shaft has attained a definite speed, which speed bears a definite relation to the speed of the motor and this relationship is such that the magnets are not unlocked until the motor is nearly up to its normal speed. The carrier which is rotated by the magnets carries a pin 50 which serves two functions. It is engageable by a latching member 51 to hold the carrier against rotation and when released by the latching lever it serves to operate switching members 52 and 53 which are shown in Figure 2 of the drawings.

Figure 4:
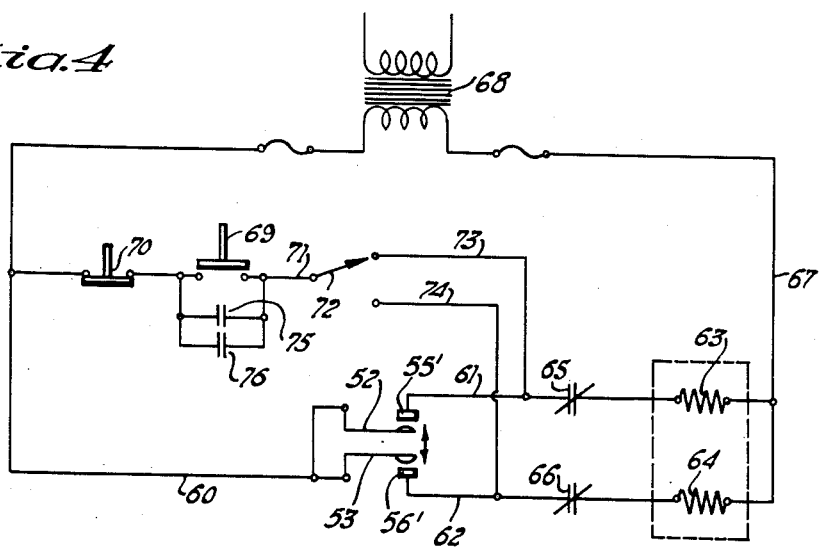
Figure 4 is a diagram of an electrical circuit according to the application of this invention.

The latching member 51 is a resilient member and is attached to the partition 54 by screws 55. The partition 54 is made out of insulating material and is attached to the housing by screws 56. The latching member 51 has an aperture 57 formed therein for receiving the pin 50 and a second aperture 58 for receiving a fixed pin 59. The switch members 52 and 53 each carry a contact button 54' which is engageable with fixed contact buttons 55' and 56'. As shown in Figure 4, the switch members 52 and 53 are connected in parallel to a common line 60 forming one side of a circuit for controlling the starting and stopping of a motor which is to be controlled by the switch of this invention.

The contacts 55' and 56' are connected by lines 61 and 62 to starter coils 63 and 64. Lines 61 and 62 have normally closed switches 65 and 66 serially arranged therein. The starter coils 63 and 64 are connected in parallel by a line 67 to a source of power such as the transformer 68.

Assuming that the starter coil 63 controls forward rotation of the motor and starter coil 64 controls reverse rotation of the motor, attention is invited to the fact that the normally closed switches 65 and 66 are also controlled by the starter coils 64 and 63 respectively with the result that when the starter coil 63 is energized it not only closes one of the motor switches but also opens the normally closed switch 66. Similarly, when the starter coil 64 is energized it opens the normally closed switch 65. The starter coils are controlled by means of the start and stop push buttons 69 and 70 respectively.

The stop push button 70 is normally closed while the start push button 69 is normally held open. They are serially arranged in the line 71 which terminates in a selector switch 72 whereby the line 71 may be alternately connected to branch line 73 or branch line 74 of the lines 61 and 62 respectively. Thus, with the selector switch set in the position shown, actuation of the start button 69 will cause energization of the starter coil 63 and thus initiate forward rotation of the motor. If the selector switch is shifted to make contact with the line 74, actuation of the push button 69 will cause reverse rotation of the motor. Since the push button 69 will automatically open when it is released, means have been provided for establishing a holding circuit in parallel with the push button. This constitutes a pair of normally open switches 75 and 76, the switch 75 being closed by the starter coil 63 and the switch 76 being closed by the starter coil 64. Thus, regardless of which one of the starter coils is energized, a holding circuit will be established in parallel with the push button 69.

Referring to Figure 2, the switch members 52 and 53 are resilient members which are attached to the support 54 by screws 77. In addition, they have auxiliary spring members 78 attached thereto which are engaged by adjustable set screws 79 mounted in fixed supports 80. By adjusting the set screws the total resistance of the switch members to movement by pin 50 may be adjusted. The important thing is that this resistance constitutes the resilient force which eventually opens the switch and returns the pin to neutral position when the speed of rotation has reduced almost to the vanishing point. Thus, by adjusting these screws, the timing of the opening of the reverse switch may be accurately set to occur just before rotation stops.

The switch member 52 is operated by a link 81 which is made of insulating material and which has a reduced portion 82 at one end for fitting in a slot formed in the switch member and an elongated hole 83 in the other end through which the fixed pin 59 passes. The link is thus supported at one end by the pin 59 and at the other end by the switch member 52. The link 81 has a depending arm 84 which engages one side of the operating pin 50. Thus, as viewed in Figure 2, if the operating pin 50 is urged in a counterclockwise direction it will effect through the link 51 a closing of the switch member 52. Similarly, the switch member 53 is operated by a link 85 which has a depending arm 86 engaging the other side of the pin 50.

The means for determining at what motor speed the latch 51 will be released is determined by a governor mechanism of the inertia type. Referring to Figure 1, the nut member 31 has a flange 87 formed integral therewith upon the face of which are pivotally mounted a pair of bell cranks 88 and 89. The bell crank 88 comprises two bifurcated arms 90 and 91 as shown in Figure 2, one of which supports an inertia member 92 and the other, a pin 93 which engages a groove 94 formed in the periphery of a sleeve 95. The other bell crank is of similar construction, having an inertia member 96 and a pin 97 which also engages the groove in the sleeve 95. The inertia members are connected by springs 98 and 99 which normally urge them toward the axis of the drive shaft, the movement being limited by the sleeve 95 engaging the flange 87. As the shaft accelerates, centrifugal force acting on the inertia members 92 and 96 will be sufficient at a predetermined speed to overcome the tension of springs 98 and 99, resulting in radial movement of the inertia members and through the bell crank connections will produce axial movement of the sleeve 95 toward the right as viewed in Figure 1, thereby releasing the latch member 51.

As soon as the latch member is released, the rotational urging force on the magnets which has been developed by rotation of the aluminum plate will move the pin 50 circumferentially about the axis of the drive shaft and dependent upon the direction of rotation, will close one of the switches 52, 53. If the starter coil 63 was energized to cause forward rotation of the motor, the switch 53 will be the one closed, and since the normally closed switch 66 is open, the circuit from the line 60 to the reverse starter coil 64 will be broken.

This condition will prevail throughout the operation of the motor until the stop button 70 is depressed, thereby opening the circuit to the starter coil 63. This closes the switch 66 whereby the circuit is now complete to the reverse starter coil 64, thereby plugging the motor and causing it to reduce speed quickly. As soon as the speed reduces to a point below that necessary to cause actuation of the governor, the latching member 51 returns into engagement with the pin 50, but since the pin 50 is held in an off-center position by the frictionless clutch, it cannot return home.

As the rate of rotation decreases, the rotational urging force on the magnets decreases until a point is reached where the resiliency of the switch member 52 is capable of overcoming it, at which time the switch member 52 will react through the link 81 to move the pin 50 back to a center position. In so doing, the circuit to the reverser coil 64 is broken before the motor starts in a reverse direction and the latch is returned to lock the pin 50. All the parts have now come to rest and since the pin 50 is positively locked, the switch mechanism is inoperative until the shaft again gets up to speed.

The purpose of locking the pin insures against sudden actuation of the motor should the operator turn the driven parts by hand which might occur when changing tools or work.

There has thus been provided an improved and compact switch mechanism for the purposes described which is efficient in operation and which is safe to utilize in connection with machines having driven parts that are subject to momentary manual operation.

What is claimed is:

1. A switch mechanism of the character described, comprising a drive shaft, a crank arm supported for free rotation on the shaft, yieldable means for coupling the crank arm for rotation by the shaft, a crank pin carried by the crank arm, switch members mounted on opposite sides of the pin for operation thereby in accordance with the direction of rotation of said shaft, positive means for preventing actuation of said pin through said yieldable means until the driving shaft has attained a predetermined speed, and speed responsive means for releasing the pin from said positive means.

2. In a plugging switch of the character described, the combination of a driving member, a driven member, impositive motion transmitting coupling means for transmitting motion from the driving member to the driven member, switching means operable by the driven member, releasable latching means for positively holding the driven member against actuation by the driving member until the driving member has attained a predetermined speed, and speed responsive means for releasing said latching means.

3. In a switch mechanism of the character described, the combination of a driving shaft, a driven member supported for free rotation on the shaft, magnetic means for developing a driving torque between the shaft and the driven member, a pair of parallelly arranged switches, a crank pin carried by the driven member and interposed between said switches, said switches being severally operable in accordance with the direction of rotation of said pin, positive means for holding said switches and said pin in a predetermined position during acceleration of the drive shaft, a speed responsive means for rendering said holding means ineffective.

4. In a switch mechanism of the character described, the combination of a reversible shaft, a driven member supported for free rotation on the shaft, a pair of resilient switch members fixedly supported on opposite sides of the axis of the shaft, a switch operating member carried by the driven member and interposed between said switches, a slip drive connection between the shaft and driven member, means for positively holding the driven member against rotation during acceleration of the shaft, and a speed responsive device driven by said shaft for releasing said holding means.

5. In a switch mechanism of the character described, the combination with a fixed support, of a pair of parallelly arranged switch members mounted on said support, an operating pin interposed between said switches, one-way motion transmitting connections between said switches and said pin whereby lateral movement of the pin from a central position will effect operation of only one switch, a spring pressed latch normally holding said pin against lateral movement in either direction, a drive shaft, a yieldable motion transmitting connection between said drive shaft and said pin, and a speed responsive device operable by said shaft for releasing said pin after said shaft has attained a predetermined speed.

6. In a device of the character described, the combination of a shaft adapted to be driven by a device to be controlled, a casing supporting said shaft, switch means in the casing adapted to form part of a control circuit for the device to be controlled, means in the casing for operating said switch in response to actuation of said shaft, means in the casing for delaying operation of said switches upon rotation of said shaft, and means responsive to a predetermined speed of said shaft, for releasing said delaying means.

7. In a device of the character described, the combination of a casing, a shaft journaled therein and adapted to be driven by a device to be controlled, switch mechanism mounted in said casing and adapted to be connected in a control circuit for said device, said switch mechanism comprising a pair of resilient switch members mounted in equally spaced relation on opposite sides of said shaft, an actuator for said switch members centrally located therebetween, means for positively locking said actuator in said position, a slip driving connection between said shaft and said member, means responsive to a definite speed of rotation of said shaft for releasing said locking means to permit operation of said switches, said resiliently operable switches being biased to return said operating member to a central position at a predetermined speed of rotation of said shaft, said last-named speed being lower than said first named predetermined speed.

8. In a switch mechanism of the character described, the combination of a drive shaft, a casing for supporting said drive shaft, a pair of plate magnets axially spaced and supported for free rotation on said shaft, each magnet having an even number of pole pieces, one-half of which are of one polarity and the other half of opposite polarity, said magnets being supported with their pole pieces in the same radial planes, the polarity of one pole in a given radial plane being of opposite polarity to the pole of the other magnet in said plane, thus creating a flow of magnetic flux parallel to the shaft, an armature plate interposed between said magnet plates for intercepting the flow of flux and creating upon rotation of the shaft an electromagnetic torque for driving said magnets, a crank pin connected with and rotatable by said magnets, independent switches operable by said pin in accordance with the direction of rotation thereof, and means for preventing actuation of said pin until the drive shaft has attained a predetermined speed.

9. In a switch mechanism of the character described, the combination of a drive shaft, a switch actuating member supported for free rotation in the shaft and having an inoperative position, a yieldable driving connection between the shaft and member, a first switch operable by the member when moved in one direction from said position, a second switch operable by the member when moved in an opposite direction from said position, a resiliently operable latch member for positively locking the switch actuating member in said position, an inertia governor carried by the shaft, a sleeve slidably mounted on said shaft and axially movable by the governor for releasing said latching member upon attainment of a predetermined speed by said shaft, thereby permitting actuation of said switch members, and means for returning said switch actuating member to its inoperative position as the speed of said shaft decreases.

WINTHROP TRIBLE.